United States Patent [19]

Kalberer, Jr. et al.

[11] 3,943,410

[45] Mar. 9, 1976

[54] LIGHT ASSEMBLY FOR USE IN A CONDUIT

[75] Inventors: Karl H. Kalberer, Jr.; Harold D. Fish, both of Duncan, Okla.

[73] Assignee: Halliburton company, Duncan, Okla.

[22] Filed: Sept. 9, 1974

[21] Appl. No.: 504,633

[52] U.S. Cl................. 317/31; 317/33 SC; 178/6.8; 178/DIG. 1
[51] Int. Cl.². ...................... H02H 3/20; H04N 7/18
[58] Field of Search ............ 317/33 VR, 31, 33 SC; 178/6.8, DIG. 1, DIG. 38; 356/241; 138/97; 73/40.5 R, 155

[56] References Cited
UNITED STATES PATENTS

| | | | |
|---|---|---|---|
| 2,371,176 | 3/1945 | Kirk et al. | 178/DIG. 1 |
| 2,849,530 | 8/1958 | Fleet | 178/6.8 |
| 2,971,259 | 2/1961 | Hahnau et al. | 178/6 |
| 3,311,787 | 3/1967 | Gunderman | 317/33 |
| 3,373,341 | 3/1968 | Wattson | 317/33 SC |
| 3,401,338 | 9/1968 | Bolvin | 317/33 SC |
| 3,544,844 | 12/1970 | Pellegrino | 317/33 SC |
| 3,582,713 | 6/1971 | Till | 317/31 |
| 3,715,484 | 2/1973 | Latall | 178/6.8 |
| 3,739,089 | 6/1973 | Latall | 178/6.8 |
| 3,761,623 | 9/1973 | Hara et al. | 178/6.8 |

OTHER PUBLICATIONS

"New Cherne T.V. System" Cherne Industrial Inc. 1972 – Advertising Publication.
Laval/USC Underground Video Survey System Publication Add. 2-5-74.

*Primary Examiner*—J. D. Miller
*Assistant Examiner*—Patrick R. Salce
*Attorney, Agent, or Firm*—Floyd A. Gonzalez; John H. Tregoning

[57] ABSTRACT

A light assembly for use with apparatus for the inspection of conduits such as underground sewer lines is presented. The light assembly includes a plurality of low energy light sources, and a current interrupting device which interrupts the current to the light sources when the voltage across the light sources exceeds a given voltage.

10 Claims, 5 Drawing Figures

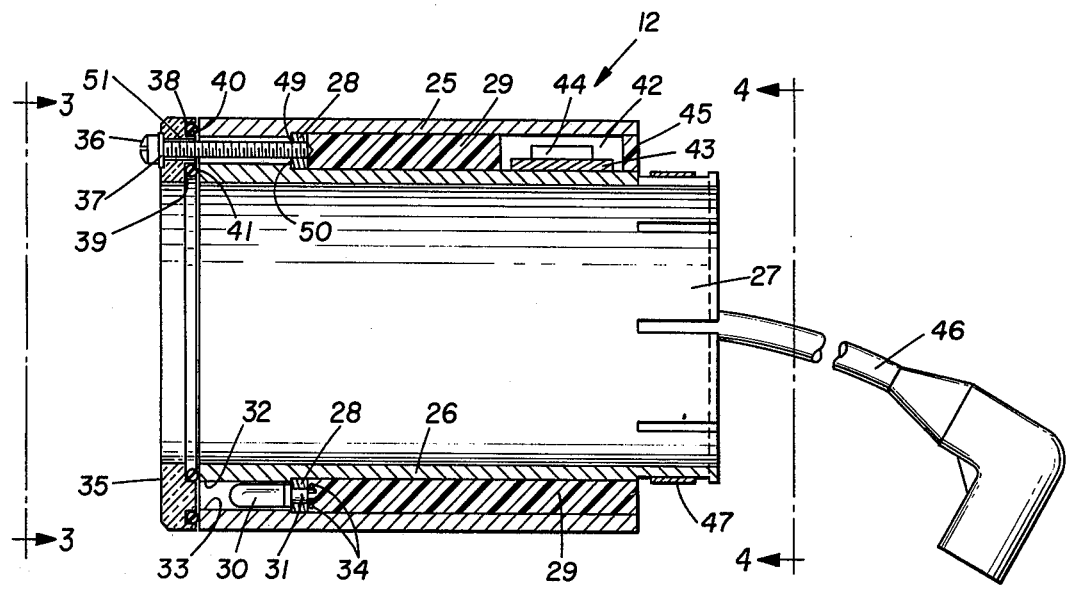
FIG. 2
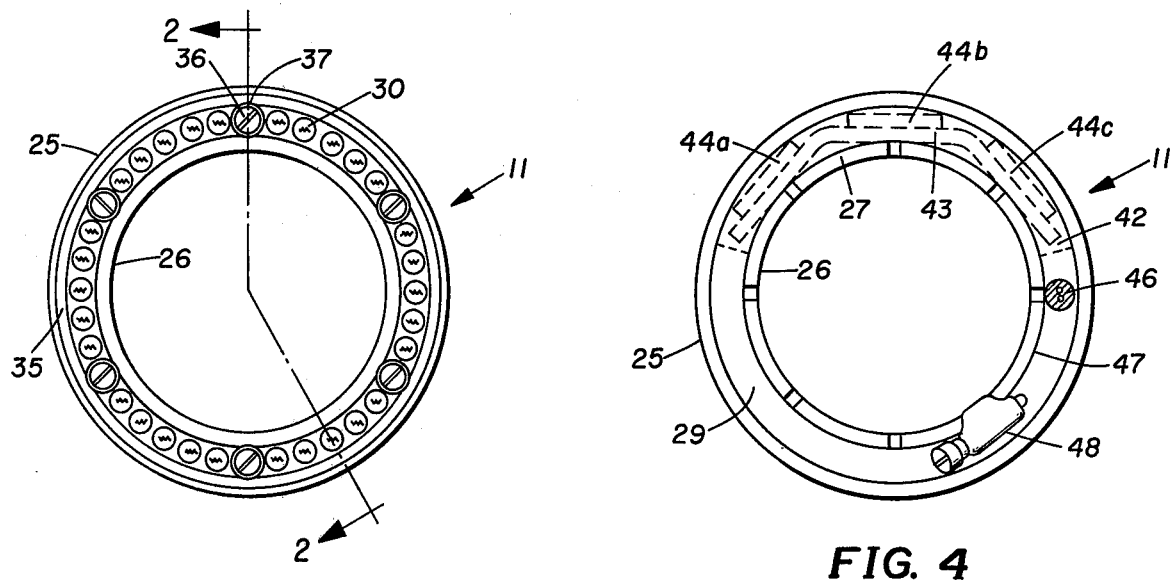
FIG. 3
FIG. 4
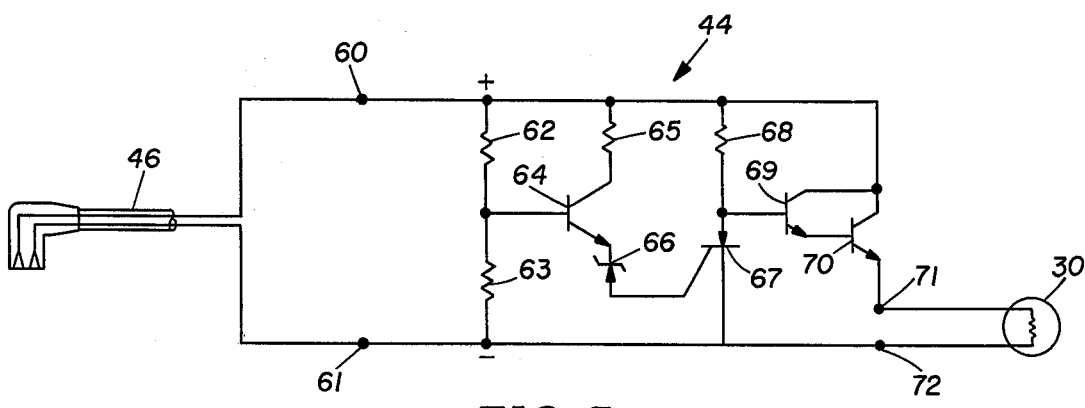
FIG. 5

«3,943,410»

LIGHT ASSEMBLY FOR USE IN A CONDUIT

BACKGROUND OF THE INVENTION

1. Field of the Invention

This invention relates to methods and apparatus for the inspection for faults in conduits such as underground pipelines. More particularly, it deals with methods and apparatus for illuminating the interior sidewalls of the conduits for use with said inspection apparatus.

2. Background of the Invention

Closed circuit television has recently been used for sewer inspection and with grouting apparatus for making repairs. With closed circuit television, location of leaks, points of infiltration, paved-over manholes, pipeline breaks, and lost articles can be accomplished without the disadvantages accompanying the digging up of the pipeline.

A major problem in the use of cameras in a pipeline is satisfactory illumination of the interior pipeline wall which will allow the camera to obtain a satisfactory closeup view of the wall. In the past, high intensity light sources such as quartz lamps have been used to give bright light in the visible range for use with a conventional camera. These lamps are undesirable because of the large amount of heat generated.

Lower power light sources have been used with large parabolic reflectors to concentrate the light in the desired locations on the pipeline sidewalls. These systems, however, are bulky and in some cases too large to be used in smaller diameter pipelines. Also, since the reflectors are generally fixed, a different light assembly must be used for each diameter of pipeline to be inspected.

This invention provides a light assembly for use in a pipeline inspection system wherein the light assembly has low energy light sources, and the assembly also has an electrical circuit which supplies electrical current to the light sources when the voltage across the sources is equal to or below a predetermined value, and which interrupts the electrical current when the light source voltage exceeds the predetermined value.

The invention also provides a light assembly for use with a pipeline inspection system and having a cylindrical body with a central bore for receiving the inspecting camera of the pipeline inspection system; and also having light sources located in one end of the cylindrical body for providing illumination for the inspecting camera.

The invention further provides a light assembly which has low power requirements, and which is suited for pipeline inspection use in a sewer line environment.

The invention also provides a light assembly for use as a universal source of illumination for the inspection of a wide range of pipeline sizes.

The invention further provides a light assembly which can easily be mounted on and removed from the camera of a pipeline inspection system.

The invention also provides a light assembly for use in underground conduits and having a current interrupting circuit which provides a simple and certain method for setting and holding the voltage across a plurality of light sources in the light assembly at an optimum value for maximum light output and minimum degradation to the life of the light sources.

BRIEF DESCRIPTION OF THE DRAWINGS

FIG. 2 is a side view in section of the light assembly.

FIG. 3 is a front view of the light assembly showing the arrangement of the light sources.

FIG. 4 is a rear view of the light assembly showing arrangement for clamping the assembly to a camera.

FIG. 5 is a schematic of the current interrupting circuit.

DESCRIPTION OF THE PREFERRED EMBODIMENT

Figure 1:
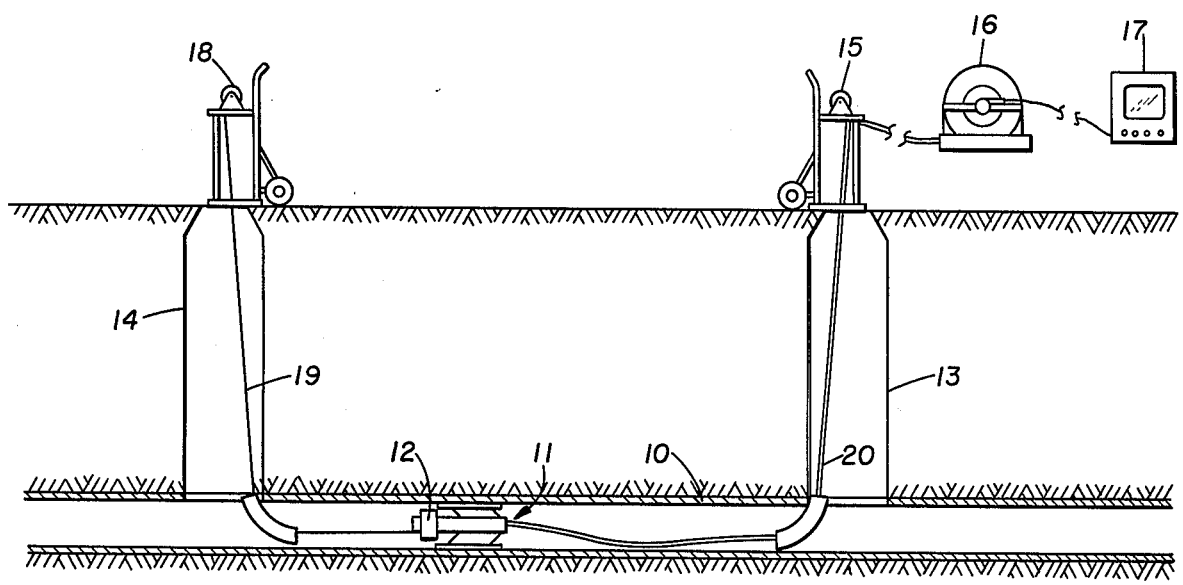
FIG. 1 is an elevation in section through a pipeline showing the light assembly as it is used with a sewer line inspection system.

A sewer line inspection system is shown in FIG. 1, and is typical of the environment in which the present invention is used. A cable 19 is first stretched from manhole 13 to manhole 14 in sewer line 10. An inspection camera assembly 11 with light assembly 12 is then attached to cable 19, and an electrical cable 20 is plugged into the inspection camera assembly 11. The inspection assembly 11 is then drawn through the sewer conduit 10 by taking up cable 19 on a winch 18 and playing out electrical cable 20 from a winch 15. Sufficient electrical cable 20 to make the run from manhole 13 to manhole 14 is stored on cable reel 16. A television monitor 17 is provided to view the interior of the conduit 10 as seen by the inspection camera assembly 11 as it is drawn from manhole 13 to manhole 14.

The electrical cable 20 is used to supply power to a television camera in the inspection assembly 11, and the light assembly 12, and also to return television signals from inspection assembly 11 to television monitor 17.

The present invention deals with light assembly 12 which is shown in detail in FIGS. 2, 3, and 4.

FIG. 2 shows that the body of light assembly 12 is made up of an outer sleeve 25 and an inner sleeve 26. The bore of the inner sleeve 26 is open so that a camera may be inserted and locked into place.

The inner sleeve 26 extends beyond the outer sleeve 25 on the rear end of the assembly, and the extended portion is slotted as shown to form a plurality of resilient fingers 27.

A ring 28 is positioned between the sleeves 25 and 26 to form an annular space between the sleeves, and is held in place by shoulders 49 and 50 in the outer sleeve 25 and inner sleeve 26 respectively.

A resin 29 is filled in behind the ring 28 in the annular space between sleeves 25 and 26 as shown and is hardened by an appropriate catalyst. The ring 28 is recessed from the front end of the sleeve 25 and 26 to leave an open annular chamber for receiving a plurality of low energy light sources such as the lamps 30 shown in FIG. 2 and FIG. 3. The lamps are mounted in sockets 31 which are spaced in the ring 28 in the circular pattern shown in FIG. 3.

That portion 32 of the inner sleeve 26, and that portion 33 of the outer sleeve 25 which are in the open annular chamber are buffed to act as reflecting surfaces for the light given off by light sources 30.

Conductors 34 are embedded in the resin 29 behind the ring 28 and are connected to each socket 31 to supply electrical energy to the light sources 30.

A window ring 35 of transparent material such as acrylic covers the front end of the open annular chamber and is held in place by screws 36. The screws 36 absorb some of the heat given off by light sources 30, and may become hot enough to damage the window ring 35. Thus, to prevent heat damage to window ring 35, the holes 51 in the window ring 35 through which screws 36 pass have larger diameters than the diameter of the screws 36. Washers 37 additionally isolate the head of screws 36 from the window ring 35.

Channels 38 and 39 are provided in the window ring 35 to receive O-rings 40 and 41. O-rings 40 and 41 are large enough that when screws 36 are tightened, a waterproof seal is established between window ring 35 and sleeves 25 and 26, and a gap is left between window ring 35 and sleeves 25 and 26. This gap is also provided to prevent damage to window ring 35 from heat absorbed by sleeves 25 and 26.

A cavity 42 is left in the resin 29 which is between outer sleeve 25 and inner sleeve 26. A metal bar 43 is located in the cavity 42, and acts as a heat sink and a chassis for a current interrupting circuit 44. FIG. 4 shows the heat sink bar 43 which is formed in an open U to fit in the annular space between sleeves 25 and 26. The current interrupting circuit 44 is divided into components 44a, 44b, and 44c and mounted on heat sink bar 45 such that the entire circuit will fit in cavity 42 as shown.

The cavity 42 around circuit 44 is filled with a soft medium such as paraffin. A thin layer of resin 45 is then filled in over the paraffin to complete the fill between the sleeves 25 and 26. If the interrupting circuit 44 should fail, it is relatively easy to remove layer 45 and dig the circuit 44 out of the paraffin encapsulation for repair.

An electrical power supply cable 46 is provided with a suitable connector plug for connection with the system power supply cable 20. Electrical conductors (not shown) are located in the annular space between sleeves 25 and 26 to connect cable 46 with interrupting circuit 44, and to connect interrupting circuit 44 with lamp conductors 34.

A strap 47 and adjustable clamping means 48 is provided around the slotted end of the inner sleeve 26. When the adjustable clamping means 48 such as the hose clamp shown is tightened, the resilient fingers 27 are forced inwardly by strap 47 to claim and hold the light assembly 12 onto the camera of the inspecting assembly 11 which is positioned in the bore of inner sleeve 25 as shown in FIG. 1.

The light sources 30 are designed to operate at a given voltage. The preferred light sources are 28 V. incandescent lamps. By increasing the voltage across the lamps by 10%, it is possible to increase the light output by 90% without appreciably shortening the life of the lamp element.

Raising the voltage above 10% of the rated voltage of the lamps will not significantly increase the light output above that realized at 10% over voltage, but will significantly decrease the life of the lamp element. Also, the additional heat generated will have harmful effects on many of the heat sensitive elements of the light assembly such as O-rings 40, 41, the window ring 35, and the electronic components of circuit 44.

Thus, current interrupting circuit 44 is designed to turn off current to light sources 30 when the voltage across the sources 30 exceeds a desired predetermined value. In this case, the preferred value is about 10% over the rated lamp voltage, or about 31 volts.

A circuit breaker having current interrupting contacts can be used. In this case the contacts would be in series with the light sources 30, and would be opened by a conventional relay when the voltage exceeded the predetermined value.

As the inspecting assembly 11 is dragged through conduit 10, it is subject to jolts and shocks as the assembly 11 passes over irregularities and pipe joints. Thus, it is possible for the current interrupting contacts to be jolted open, causing the illumination from the light sources 30 to flicker, and the contacts to arc and burn. For this reason the solid state circuit of FIG. 5 is preferred.

Terminals 60 and 61 would be connected to power supply cable 46, while terminals 71 and 72 would be connected to light sources 30 as shown. Current is supplied to terminal 71 by transistors 69 and 70 which are connected in a Darlington configuration. It can be seen that the current to terminal 71 is interrupted if the base circuit voltage of the Darlington pair is sufficiently low. An SCR 67 is used for this purpose. When SCR 67 conducts, the Darlington pair is turned off and current to terminal 71 is interrupted, and when SCR 67 is nonconducting, current is supplied to terminal 71.

The conduction of SCR 67 is in turn controlled by a source of current connected to its gate through a Zener diode 66 in the emitter-base path of transistor 64. Resistors 62 and 63 form a voltage divider such that circuit 44 is switched off when the terminal voltage across terminals 60 and 61 is at the selected value. It can be seen that the voltage across terminals 71 and 72 is essentially the same as the voltage across terminals 60 and 61 when the Darlington pair is on, differing only by the collector-to-emitter voltage of transistor 70.

In operation, when the voltage on terminal 60 is raised from 0 volts, the voltage at the emitter of transistor 64 is likewise raised until the Zener voltage of Zener diode 66 is reached. At this point, Zener diode 66 conducts current to the gate of SCR 67 causing SCR 67 to turn on. When SCR 67 turns on, the base voltage of transistor 69 is suddenly reduced to the point that the current being supplied by transistors 69 and 70 to terminal 71 and light sources 30 is interrupted.

After the source voltage between terminals 60 and 61 is lowered sufficiently, the voltage across Zener diode 66 will be lowered below its Zener voltage and the gate current to SCR 67 will be interrupted. However, the "holding current" of SCR 67 will continue to hold the Darlington pair off by keeping the voltage at the base of transistor 69 near zero. Thus, the current flow to light sources 30 cannot be reestablished until the source voltage is either slightly lowered and momentarily interrupted, or is reduced sufficiently that the holding current of SCR 67 can no longer be sustained.

If the source voltage is raised sufficiently for circuit 44 to interrupt the current, it is more advantageous to lower the source voltage to zero and then increase it again to a point just below the interrupting value. This practice lengthens the life of the light sources 30 because the full voltage is never instantaneously placed across them.

The preferred circuit elements are as follows:
62: Resistor, selected dependent on the desired interrupting voltage
63: Resistor, 2K ohm, 1W, 1%
64: Transistor, Motorola MJE521
65: Resistor, 2.7K ohm, 1W, 5%
66: Zener Diode, IN5242 B
67: SCR 2N4441
68: Resistor, WW, 1K ohm, 3W, 5%

69: Transistor, Motorola, MJE521
70: Transistor, Motorola, MJE3055

For circuit 44 to interrupt current to light sources 30 when the voltage between terminals 71 and 72 is approximately 32 volts, resistor 62 is a 3.3K ohm, 1W, 1% resistor. To decrease the interrupting voltage, the resistance of resistor 62 can be decreased, or to increase the interrupting voltage, the resistance of resistor 62 can be increased.

As set out above, the interrupting circuit is important in that the light intensity can be significantly increased by over-exciting the light sources 30 by a desired amount. However, raising the voltage too high will greatly reduce the life of the sources 30 and will generate excessive heat. The interrupting circuit 44 is designed to interrupt the electrical current to the light sources 30 when the desired maximum voltage is exceeded. Thus, circuit 44 allows the light sources 30 to be over-excited to increase their light output, but limits the over-excitation before the life of the light sources 30 is greatly affected.

The interrupting circuit also provides a significant advantage when a longer than normal run is being made with the inspection system 11. When additional power supply cable 20 is plugged into the system, it is possible that the resistance of the additional cable will lower the voltage at the light sources 30 sufficiently that the light emitted will not be bright enough to properly illuminate the larger pipe sizes. The voltage at the source end of the cable 20 can be increased until the interrupting circuit 44 in the light assembly 12 causes the light sources 30 to go out. The voltage can then be reduced to zero and again increased to a point just below the interrupting value. Thus, the proper voltage will be applied across the light sources 30 to supply the maximum amount of light without harm to the light sources 30.

The present invention may be embodied in other specific forms without departing from the spirit or essential characteristics thereof. The presently disclosed embodiments are therefore to be considered in all respects as illustrative, and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A light assembly for use with an apparatus having a camera for inspecting a conduit comprising:
   a cylindrical outer sleeve;
   a cylindrical inner sleeve spaced concentrically within said outer sleeve forming an annular chamber therebetween;
   a plurality of light sources located in the annular chamber and near one end of said inner and outer sleeves;
   an electrical cable secured to one of said sleeves for supplying electrical current; and
   an electrical circuit located in said annular chamber and connecting said electrical cable to said light sources for passing electrical current when the voltage across said light sources does not exceed a predetermined value, and for interrupting electrical current when the voltage across said light sources does exceed said predetermined value.

2. The light assembly of claim 1 further comprising a transparent window ring positioned on the one end of said inner and outer sleeves and covering the annular chamber over said light sources.

3. The light assembly of claim 2 further comprising a spacing ring located in the annular chamber between said inner and outer sleeves; for maintaining the spacing between said inner and outer sleeves, for supporting said light sources which are mounted thereon in that portion of the annular chamber between said spacing ring and said window ring, and for closing the annular chamber between said light sources and said electrical circuit.

4. The light assembly of claim 3 further comprising:
   sealing means between said window ring and said inner and outer sleeves for forming a waterproof seal over the one end of the annular chamber between said inner and outer sleeves; and
   means filling that portion of the annular chamber between said spacing ring and the second end of said outer sleeve for embedding said electrical circuit and for forming a waterproof seal over the second end of the annular chamber between said inner and outer sleeves.

5. The light assembly of claim 1 wherein the second end of said inner sleeve extends beyond the second end of said outer sleeve, and the extended portion of said inner sleeve has a plurality of longitudinal slots.

6. The light assembly of claim 5 further comprising a clamping means around the extended portion of said inner sleeve for biasing said extended portion radially inwardly when said clamping means is tightened.

7. The light assembly of claim 1 wherein said electrical circuit comprises a semiconductor device having a controllable first terminal passing current to said light sources and having a second terminal controlling said first terminal such that said first terminal passes current when the voltage between said first and second terminals is above a set value, and said first terminal does not pass current when the voltage between said first and second terminals is not above the set value; and means connected between said first and second terminals for lowering the voltage between said terminals below the set value when the voltage across said light sources exceeds the predetermined value.

8. The light assembly of claim 7 wherein said voltage lowering means continues to maintain the voltage between said terminals below the set value until the voltage across said light sources is lowered below a predetermined minimum value.

9. The light assembly of claim 8 wherein said semiconductor device is a pair of transistors having;
   a common base connection,
   the emitter of the first transistor of said transistor pair connected to the base of the second transistor of said transistor pair,
   the emitter of said second transistor is said first terminal, and
   the base of said first transistor is said second terminal.

10. The light assembly of claim 9 wherein said voltage lowering means comprises a silicon controlled rectifier, a third transistor for passing gate current to said silicon controlled rectifier, and a Zener diode in the base-emitter circuit of said third transistor.

* * * * *